(12) United States Patent
Slevin

(10) Patent No.: US 11,603,460 B2
(45) Date of Patent: Mar. 14, 2023

(54) THERMOSET INSULATION COMPOSITION

(71) Applicant: AEI Compounds Ltd., Sandwich (GB)

(72) Inventor: Mike Edward Slevin, Chartham (GB)

(73) Assignee: AEI Compounds Ltd., Sandwich (GB)

( * ) Notice: Subject to any disclaimer, the term of this patent is extended or adjusted under 35 U.S.C. 154(b) by 0 days.

(21) Appl. No.: 15/752,662

(22) PCT Filed: Aug. 3, 2016

(86) PCT No.: PCT/IB2016/054694
§ 371 (c)(1),
(2) Date: Feb. 14, 2018

(87) PCT Pub. No.: WO2017/033079
PCT Pub. Date: Mar. 2, 2017

(65) Prior Publication Data
US 2018/0230302 A1   Aug. 16, 2018

Related U.S. Application Data

(60) Provisional application No. 62/209,178, filed on Aug. 24, 2015.

(51) Int. Cl.
| | | |
|---|---|---|
| *C08L 51/06* | (2006.01) | |
| *C08F 255/02* | (2006.01) | |
| *C08F 255/04* | (2006.01) | |
| *C08L 23/04* | (2006.01) | |
| *C08L 23/06* | (2006.01) | |
| *C08K 3/22* | (2006.01) | |

(52) U.S. Cl.
CPC ........... *C08L 51/06* (2013.01); *C08F 255/02* (2013.01); *C08F 255/04* (2013.01); *C08L 23/04* (2013.01); *C08L 23/06* (2013.01); *C08K 2003/2224* (2013.01); *C08L 2201/02* (2013.01); *C08L 2203/202* (2013.01); *C08L 2205/02* (2013.01); *C08L 2207/066* (2013.01)

(58) Field of Classification Search
CPC .......... C08L 51/06; C08L 23/04; C08L 23/06; C08L 2201/02; C08L 2203/202; C08L 2205/02; C08L 2207/066; C08F 255/02; C08F 255/04; C08K 2003/2224
USPC ........................................................ 524/436
See application file for complete search history.

(56) References Cited

U.S. PATENT DOCUMENTS

| | | | |
|---|---|---|---|
| 4,732,939 A | | 3/1988 | Hoshi et al. |
| 4,921,916 A | | 4/1990 | Howell et al. |
| 5,112,919 A | | 5/1992 | Furrer et al. |
| 5,312,861 A | | 5/1994 | Meverden et al. |
| 5,401,787 A | | 5/1995 | Tonyali |
| 5,474,602 A | | 12/1995 | Brown et al. |
| 5,714,547 A | * | 2/1998 | Li ........................... C08L 23/06 525/240 |
| 5,824,718 A | * | 10/1998 | Penfold ................... H01B 3/441 522/120 |
| 5,872,169 A | * | 2/1999 | Elsner ....................... C08K 3/22 423/640 |
| 5,883,144 A | | 3/1999 | Bambara et al. |
| 5,889,087 A | | 3/1999 | Hayashi et al. |
| 5,986,028 A | | 11/1999 | Lai et al. |
| 6,025,424 A | | 2/2000 | Katsuki et al. |
| 6,495,760 B1 | | 12/2002 | Castellani et al. |
| 6,552,112 B1 | | 4/2003 | Redondo et al. |
| 6,676,920 B1 | | 1/2004 | Oishi et al. |
| 6,703,435 B2 | | 3/2004 | Barioz |
| 6,750,282 B1 | | 6/2004 | Schall et al. |
| 6,864,323 B2 | | 3/2005 | Schlosser et al. |
| 6,894,101 B2 | | 5/2005 | Paul et al. |
| 6,924,031 B2 | | 8/2005 | Grizante Redondo et al. |
| 7,196,130 B2 | | 3/2007 | Uehara et al. |
| 7,232,856 B1 | | 6/2007 | Campbell et al. |
| 7,304,245 B2 | | 12/2007 | Alexander et al. |
| 7,652,090 B2 | | 1/2010 | Alexander et al. |

(Continued)

FOREIGN PATENT DOCUMENTS

| | | | | |
|---|---|---|---|---|
| CS | 9002396 A2 | * | 3/1992 | ................ C01F 5/14 |
| EP | 0245938 A2 | | 11/1987 | |

(Continued)

OTHER PUBLICATIONS

"Dow AFFINITY™ KC 8852G Polyolefin Plastomer (POP)," MatWeb, (1996-2019) [retrieved on Jun. 28, 2019]. Retrieved from the Internet: <URL: http://www.matweb.com/search/datasheet.aspx?matguid=ed26367ec27f4dd0ba263f1f8ad5b2ed>. (Year: 1996).*

Ash et al., Ed, "Magnifin H5 GV," Handbook of Green Chemicals, 2nd Ed., Synapse Information Resources, p. 743. (Year: 2008).*

Li et al., "Preparation of magnesium hydroxide flame retardant from light calcined powder by ammonia circulation method," Powder Tech., vol. 260, pp. 98-104. (Year: 2014).*

(Continued)

*Primary Examiner* — Ling Siu Choi
*Assistant Examiner* — Ronald Grinsted
(74) *Attorney, Agent, or Firm* — Foley & Lardner LLP

(57) ABSTRACT

Crosslinkable insulation materials, which are commonly halogen-free, for use in wire and cable applications are provided. The insulation include a crosslinkable thermoplastic polymer and flame retardant material. The flame retardant material may include a metal hydroxide flame retardant, such as a magnesium, calcium, zinc and/or aluminum hydroxide. The crosslinkable thermoplastic polymer includes silane-grafted polymer blend, which includes a polyolefin plastomer blended with one or more other thermoplastic polymers. The crosslinkable thermoplastic polymer may be curable by exposure to moisture and may include moisture curable silane functionality in the crosslinkable thermoplastic polymer.

18 Claims, No Drawings

(56) References Cited

U.S. PATENT DOCUMENTS

| | | | |
|---|---|---|---|
| 7,943,694 | B2 | 5/2011 | Varnhorn et al. |
| 8,129,619 | B2 | 3/2012 | Moriuchi et al. |
| 8,494,326 | B2 | 7/2013 | Consonni et al. |
| 8,525,028 | B2 | 9/2013 | Cree et al. |
| 8,895,857 | B2 | 11/2014 | Shiraki et al. |
| 9,318,240 | B2 | 4/2016 | Yan et al. |
| 2003/0114604 | A1 | 6/2003 | Schlosser et al. |
| 2003/0134969 | A1 | 7/2003 | Schlosser et al. |
| 2005/0131129 | A1 | 6/2005 | Uehara et al. |
| 2010/0209705 | A1 | 8/2010 | Lin et al. |
| 2010/0282489 | A1 | 11/2010 | Cree et al. |
| 2011/0056728 | A1 | 3/2011 | Shiraki et al. |
| 2013/0126070 | A1* | 5/2013 | Siqueira ............... B32B 5/26 156/229 |
| 2014/0080953 | A1* | 3/2014 | Goberti ............... C08L 23/16 524/400 |
| 2014/0256864 | A1* | 9/2014 | Isago ............... C08J 3/203 524/400 |
| 2014/0370315 | A1* | 12/2014 | Iwasaki ............... H01B 3/441 428/516 |

FOREIGN PATENT DOCUMENTS

| | | |
|---|---|---|
| EP | 0365289 A2 | 4/1990 |
| EP | 1 116 244 B1 | 12/2002 |
| EP | 1 524 294 A1 | 4/2005 |
| JP | 2016134312 A * | 7/2016 |
| WO | WO-00/19452 A1 | 4/2000 |
| WO | WO-2009/042387 A1 | 4/2009 |
| WO | WO-2009/097410 A1 | 8/2009 |

OTHER PUBLICATIONS

"Martinal® Aluminum Hydroxide + Magnifin® Magnesium Hydroxide," J.M. Huber Corp. :<URL: https://www.hubermaterials.com/userfiles/files/PFDocs/Martinal%20Aluminum%20Hydroxide%20and%20Magnifin%20Magnesium%20Hydroxide%20-%20Halogen-Free%20Flame%20Retardants%20for%20the%20Cable%20Industry.pdf> (Year: 2018).*

CS 9002396 A2, machine translation, InnovationQ Plus (IP.com). (Year: 1992).*

JP 2016134312 A, machine translation, EPO espacenet. (Year: 2016).*

Gilman et al., "Nanocomposites: A Revolutionary New Flame Retardant Approach," SAMPE Journal, vol. 33 No. 4, 1997, pp. 40-46.

International Search Report and Written Opinion for PCT/IB2016/05694, dated Oct. 24, 2016, 8 pages.

Stryczek et al., New Low Smoke Zero Halogen Tray Cable Jacket Materials designed for Balance of Cost, Performance and Enhanced Fire Resistance, Proceedings of the 63rd International Wire & Cable Symposium, pp. 713-717 (Feb. 2015); http://assets.conferencespot.org/fileserver/file/322619/filename/089_P-22.pdf.

* cited by examiner

THERMOSET INSULATION COMPOSITION

BACKGROUND

Cable insulation materials are used in the wire and cable industry to confer insulation of electrical conductors. Such insulation materials must satisfy long term wet electrical, mechanical performance & fire requirements, for example such as detailed in UL44 for XHHW-2.

In recent years, the use of a halogen such as bromine or chlorine has been limited in many countries. Gases evolved during burning can be corrosive, toxic, harmful & generate dense smoke obscuring escape in fire situations. The potential advantages of halogen free cables may include reduced environmental and corrosive impact, as well as a potential reduction in smoke and/or toxic gas generation.

There is continuing a need to produce moisture resistant cable insulation materials that are substantially free of halogen-containing compounds while maintaining the necessary attributes of cable insulation materials.

SUMMARY

The present application relates generally to the field of materials which can be used as insulation materials in wire and cable applications. The insulation materials are desirably crosslinkable, halogen-free polymer compositions, which typically includes a moisture curable thermoplastic polymer and flame retardant material. The flame retardant material typically includes a metal hydroxide flame retardant, such as a magnesium, calcium, zinc and/or aluminum hydroxide. The crosslinkable thermoplastic polymer commonly includes a silane grafted polymer blend. The polymer blend may include polyolefin plastomer, which may be blended with one or more other thermoplastic polymers, such as a thermoplastic polyolefin and/or an olefin block copolymer. The crosslinkable thermoplastic polymer is desirably curable by exposure to moisture, e.g., by the inclusion of moisture curable silane functionality in the thermoplastic polymer. This may be accomplished by grafting silane functional groups onto one or more thermoplastic polymers in the composite. For example, a crosslinkable thermoplastic polymer blend may include ethylene copolymer plastomer and a thermoplastic polyolefin (such as polyethylene), which have been grafted with silane functional groups, e.g., through free radical initiated reaction with a vinyl alkoxysilane, such as a vinyltrialkoxysilane. The present crosslinkable polymer composite materials are typically substantially free of halogen-containing compounds.

The present application provides a crosslinkable, halogen-free polymer wire insulation composition. The wire insulation composition includes a crosslinkable thermoplastic polymer component, which may include a silane-grafted polymer blend, and metal hydroxide flame retardant. The silane-grafted polymer blend is typically formed by silane-grafting a polymer blend which includes about 35-65 wt. % thermoplastic plastomer and about 35 to 65 wt. % thermoplastic polyolefin. The metal hydroxide flame retardant may include magnesium, calcium, zinc or aluminum hydroxide(s) or a mixture thereof and typically includes magnesium dihydroxide (MDH).

In some embodiments, the crosslinkable polymer composition may be a moisture curable, halogen-free polymer composite which includes a polymer component and a metal hydroxide flame retardant. The metal hydroxide flame retardant typically includes magnesium hydroxide and/or aluminum hydroxide. The polymer component may include one or more of a silane-grafted ethylene/alpha-olefin plastomer and a silane-grafted thermoplastic polyolefin (e.g., a silane-grafted polyethylene). The polymer component may optionally include ethylene/alpha-olefin plastomer and a thermoplastic polyolefin.

DETAILED DESCRIPTION

The present application provides moisture curable polymer wire insulation compositions, which typically exhibit long term water resistance at higher temperatures. The moisture curable insulation materials may be used in wire and cable applications and are typically halogen-free. The insulation material includes a crosslinkable thermoplastic polymer and flame retardant material. The flame retardant material may include a metal hydroxide flame retardant, such as a magnesium, calcium, zinc and/or aluminum hydroxide. The crosslinkable thermoplastic polymer is typically curable by exposure to moisture and may include moisture curable silane functionality in the thermoplastic polymer, e.g., silane functionality that has been grafted onto the thermoplastic polymer(s). For example, the crosslinkable thermoplastic polymer may include silane grafted functionality in a blend of thermoplastic polymers which includes polyolefin plastomer (e.g., ethylene/alpha-olefin plastomer) and a thermoplastic polyolefin, such as a linear low density polyethylene. The polymer blend may include about 35 to 65 wt. % of the ethylene/alpha-olefin plastomer and about 35% to 65% of the thermoplastic polyolefin.

The polymer wire insulation composition typically includes about 50 to about 300 parts by weight of the metal hydroxide flame retardant per 100 parts by weight of the crosslinkable thermoplastic polymer. For example, the wire sheathing composition may include about 75 to 200 parts by weight magnesium dihydroxide (MDH) per 100 parts by weight of the crosslinkable thermoplastic polymer. The crosslinkable thermoplastic polymer typically includes a silane-grafted polymer blend, which may be formed by reacting a mixture which includes polyolefin plastomer, thermoplastic polyolefin, vinyl alkoxysilane and a free radical initiator. For example, the polymer blend may include about 35 to 65 wt. % of an ethylene/alpha-olefin plastomer and about 35 to 65 wt. % of linear low density thermoplastic polyethylene.

The polyolefin plastomer in the mixture may include one or more ethylene/alpha-olefin plastomers. In some instances, the polyolefin plastomer may include an ethylene/alpha-olefin plastomer having an MFI at 190° C. of about 1-5 g/10 min (MFI as determined pursuant to ISO 1133).

The polyolefin plastomer blends may suitably include an ethylene/1-octene plastomer having a melting temperature of about 70-80° C. (as determined pursuant to ISO 11357) and/or a Shore D Hardness of no more than about 30 and a Shore A Hardness of about 80 to 90 (as determined pursuant to ISO 868). Such an ethylene/1-octene plastomer may have an MFI at 190° C. of about 1-5 g/10 min and an elongation at break of at least about 500%, more desirably at least about 800% (as determined pursuant to ISO 527-2(5A)).

The thermoplastic polyolefin in the mixture may suitably have an MFI at 190° C. of about 1 to 5 g/10 min (as determined pursuant to ISO 1133). In many embodiments, the thermoplastic polyolefin may include a linear low density polyethylene. For example, the thermoplastic polyolefin may be a linear low density thermoplastic polyethylene (LLDPE) having an MFI at 190° C. of about 1 to 5 g/10 min (as determined pursuant to ISO 1133). In some embodiments, the linear low density thermoplastic polyethylene may include a LLDPE produced by copolymerization of ethylene and an alpha-olefin, such as butene, hexene, or octene. For example, the thermoplastic polyolefin may include a LLDPE produced by copolymerization of ethylene and hexene ("C6-LLDPE"), where the C6-LLDPE may have an MFI at 190° C. of about 1 to 5 g/10 min. The linear low density thermoplastic polyethylene may desirably have a density of about 0.91 to 0.93 g/cm$^3$ and/or a melting temperature of about 120 to 130° C.

The flame retardant material may be metal hydroxide flame retardant, such as a magnesium, calcium, zinc and/or aluminum hydroxide. The flame retardant material typically includes magnesium hydroxide and/or aluminum hydroxide, which commonly has an average particle size no more than about 3 microns and often no more than about 2 microns. For example, the flame retardant material may include magnesium hydroxide having average particle size of no more than about 2 microns. The magnesium hydroxide may be in the form of magnesium dihydroxide having average particle size of about 0.1 to 2 microns. The magnesium hydroxide may include magnesium dihydroxide having a d$_{50}$ of about 0.5-2 microns, a BET of about 1-15 m$^2$/g and/or a bulk density of about 300-600 g/L. The magnesium dihydroxide may be a precipitated magnesium dihydroxide (MDH).

In some embodiments, the flame retardant material may include a mixture of magnesium hydroxide materials having differing particle sizes, surface areas and/or bulk densities. For example, the flame retardant material may include a first magnesium dihydroxide material having a d$_{50}$ of about 1.5-2 microns, a BET of about 2-5 m$^2$/g and/or a bulk density of about 450-600 g/L and a second magnesium dihydroxide material having a d$_{50}$ of about 0.7-1.2 microns, a BET of about 8-12 m$^2$/g and/or a bulk density of about 300-500 g/L. Such a flame retardant mixture may include about 40 to 75 wt. % of the first magnesium dihydroxide and 25 to 60 wt. % of the second magnesium dihydroxide.

The present crosslinkable polymer composites may suitably contain a number of optional ingredients. For example, the composites may include anti-oxidant(s), a UV protector/light stabilizer, colorant, and lubricants, such as an UHMW silicone (which may be dispersed in a thermoplastic polyolefin such as polyethylene), and/or other processing aids. The crosslinkable composite typically includes antioxidant, ultrahigh molecular weight silicone processing additive and UV protector/light stabilizer additive.

In some embodiments, the present composite includes about 25 to 60 wt. % of the silane-grafted thermoplastic polymer blend and about 40 to 70 wt. % magnesium dihydroxide. The polymer blend may include about 35 to 70 wt. % of an ethylene/alpha-olefin plastomer, e.g., an ethylene/1-octene plastomer having an MFI of about 1-5 g/10 min, and about 35 to 65 wt. % of a very low density thermoplastic polyethylene, e.g., a linear low density polyethylene having an MFI at 190° C. of about 1 to 5 g/10 min (as determined pursuant to ISO 1133).

The silane grafted polymer blend may be compounded with metal hydroxide flame retardant (e.g., magnesium hydroxide and/or aluminum hydroxide) and other conventional additives and then extruded to form a halogen free, flame-retardant, crosslinkable polymer composite. The crosslinkable polymer composite is typically UV stabilized and is curable by exposure to moist conditions. In use, the crosslinkable polymer composite may be mixed with a crosslinking catalyst masterbatch, e.g., in a ratio of about 95:5 to 99:1 (commonly about 97:3). The moisture cured product is desirably able to satisfy the requirements of the UL44 standards. The product typically shows good flexibility and confers tough sheathing protection. It is particular notable that the moisture cured product may exhibit the excellent high temperature water resistance required under the specifications of UL44, in combination with one or more of the other specifications typically required for such sheathing materials.

The tables below provide illustrations of suitable formulations for producing the present crosslinkable halogen-free, flame retardant filled polymer composites. The components for listed for Silane Grafted Blend Formulation A1 can be melt processed, e.g., via extrusion, to provide Silane Grafted Polymer Blend A1. This may then be combined in the amount shown with the other ingredients listed for Flame Retardant Filled Polymer Composite Formulation HFFR-1 in a melt processing step, e.g., via extrusion, to provide a crosslinkable polymer composite. The components for listed for Silane Grafted Blend Formulation A2 can be melt processed, e.g., via extrusion, to provide Silane Grafted Polymer Blend A2. This may then be combined in the amount shown with the other ingredients listed for Flame Retardant Filled Polymer Composite Formulation HFFR-2 in a melt processing step, e.g., via extrusion, to provide a crosslinkable polymer composite.

The tables below provide illustrations of suitable formulations for producing the present crosslinkable halogen-free, flame retardant filled polymer composites. The components for listed for Silane Grafted Polymer Blend Formulation A1 can be melt processed, e.g., via extrusion, to provide Silane Grafted Polymer Blend A1. This may then be combined in the amount shown with the other ingredients listed for Flame Retardant Filled Polymer Composite Formulation HFFR-1 in a melt processing step, e.g., via extrusion, to provide a crosslinkable polymer composite. The components for listed for Silane Grafted Polymer Blend Formulation A2 can be melt processed, e.g., via extrusion, to provide Silane Grafted Polymer Blend A2. This may then be combined in the amount shown with the other ingredients listed for Flame Retardant Filled Polymer Composite Formulation HFFR-2 in a melt processing step, e.g., via extrusion, to provide a crosslinkable polymer composite.

| Silane Grafted Blend Formulation A1 | | |
| --- | --- | --- |
| Component | Wt. % | Notes |
| Polyolefin plastomer | 35-65 | Ethylene/alpha-olefin plastomer |
| Thermoplastic Polyolefin | 35-65 | Thermoplastic polyethylene |
| Vinyl Silane | 1-3 | Vinyl alkoxysilane |
| Organic peroxide | 0.05-0.2 | Organic peroxide |

| Flame Retardant Filled Polymer Composite Formulation HFFR-1 | | |
| --- | --- | --- |
| Component | Wt. % | Notes |
| Silane grafted polymer blend A1 | 35-55 | Silane-grafted plastomer blend with thermoplastic polyethylene and polyolefin plastomer |
| Optional UHMW silicone | 0-3 | Typically as dispersion in thermoplastic polyolefin |

-continued

| Flame Retardant Filled Polymer Composite Formulation HFFR-1 | | |
|---|---|---|
| Component | Wt. % | Notes |
| Magnesium hydroxide and/or aluminum hydroxide | 40-65 | Typically average particle size of no more than 3 microns |
| Antioxidant | 0.5-3 | |
| Optional UV Protector/Light Stabilizer | 0-1 | |
| Optional colorant | 0-4 | |
| Optional processing aids | 0-5 | |

| Silane Grafted Blend Formulation A2 | | |
|---|---|---|
| Component | Wt. % | Notes |
| Polyolefin plastomer | 40-60 | Ethylene/octene plastomer |
| Thermoplastic polyethylene | 40-60 | Thermoplastic LLDPE |
| Anti-oxidant | 0.1-5 | |
| Vinyl Silane | 1-3 | VTMOS and/or VTES |
| Organic peroxide | 0.05-0.2 | Organic peroxide |

| Flame Retardant Filled Polymer Composite Formulation HFFR-2 | | |
|---|---|---|
| Component | Wt. % | Notes |
| Silane grafted polymer blend A2 | 30-40 | Silane-grafted polymer blend with thermoplastic LLDPE and ethylene/octene plastomer |
| UHMW silicone | 0.5-2 | Typically as 50% dispersion in polyethylene homopolymer |
| Magnesium hydroxide | 55-70 | $Mg(OH)_2$ |
| Antioxidant | 0.5-3 | |
| Optional UV Protector/Light Stabilizer | 0-1 | |
| Optional colorant | 0-4 | |
| Optional processing aids | 0-5 | |

EXAMPLES

The following examples more specifically the present cleaning compositions according to various embodiments described above. These examples should in no way be construed as limiting the scope of the present technology.

Unless expressly defined differently, all melt flow indexes (MFI) referred to herein were determined at 190° C. pursuant to ISO 1133. In some instances, as expressly noted the MFI may be determined at 190° C. pursuant to ASTM D1238. Shore D Hardness values referred to herein were determined pursuant to ISO 868. Unless stated otherwise, melting temperatures were determined pursuant to ISO 11357. Densities were determined pursuant to ISO 1183.

Production of a halogen free flame-retardant, silane cross-linkable, UV stabilized, flexible polymer composite, curable by exposure to moist conditions can be carried out by in a first operation, silane grafting a thermoplastic polymer blend with a silylating agent (e.g., a vinyl alkoxysilane) in the presence of a free radical catalyst. This can be carried out by combining the components for listed below for the 1$^{st}$ Pass—Silane Grafting Formula via a melt processing operation, e.g., via extrusion compounding between about 195 and 220° C. melt temperature, to provide the 1$^{st}$ Pass Silane Grafted Polymer Blend. This Silane Grafted Blend may then be combined in the amount shown with the other ingredients listed for the 2$^{nd}$ Pass—Flame Retardant Filled Polymer Composite in a separate melt processing step, e.g., via extrusion compounding between about 150 and 200° C., to provide a crosslinkable polymer composite.

| 1$^{st}$ Pass Silane Grafting Polymer Blend | | |
|---|---|---|
| Material | Wt. % | Notes |
| Ethylene/octene plastomer | 45-55 | MFI @ 190° C. 1-5 |
| LLDPE | 45-55 | MFI @ 190° C. 1-5 |
| Anti Ox MB | 1-5 | |
| Process aid MB | 0-3 | |
| VTMOS | 1-2 | Vinyl trimethoxysilane |
| Peroxide | 0.05-0.2 | |

| 2$^{nd}$ Pass Flame Retardant Filled Polymer Composite | | |
|---|---|---|
| Material | Wt. % | Notes |
| 1$^{st}$ Pass Grafting | 40-50 | Silane-grafted plastomer blend with thermoplastic polyolefin and polyolefin plastomer |
| Ultra-high molecular weight siloxane | 0.3-1 | UHMW siloxane polymer dispersed in polyethylene |
| Magnesium hydroxide | 45-60 | Precipitated $Mg(OH)_2$ having average particle size of about 0.5-2 microns |
| Antioxidant | 0.2-1 | |
| UV/light stabilizer | 0-0.5 | UV Protector/Light Stabilizer |
| Processing additive | 0.1-0.5 | |

ILLUSTRATIVE EMBODIMENTS

While certain embodiments have been illustrated and described, it should be understood that changes and modifications can be made therein in accordance with ordinary skill in the art without departing from the technology in its broader aspects.

In one embodiment, the crosslinkable, halogen-free polymer composite includes a crosslinkable thermoplastic polymer and metal hydroxide flame retardant selected from magnesium, calcium, zinc and aluminum hydroxide or mixtures thereof. The crosslinkable thermoplastic polymer may be a moisture curable, halogen-free polymer composition. The crosslinkable thermoplastic polymer may include a silane-grafted polymer blend, where the polymer blend typically includes ethylene/alpha-olefin plastomer, thermoplastic polyolefin and olefin block copolymer. The composition commonly also includes one or more of antioxidant, ultrahigh molecular weight silicone processing additive and UV protector/light stabilizer additive. The crosslinkable polymer composition may include about 25 to 55 wt. % of the silane-grafted thermoplastic polymer blend; and about 40 to 75 wt. % of the metal hydroxide flame retardant. The polymer blend may include about 35% to 65% of an ethylene/alpha-olefin plastomer, e.g., an ethylene/octene plastomer having an MFI at 190° C. of about 1-5 g/10 min (as determined pursuant to ISO 1133), and about 35 to 65 wt. % of a thermoplastic polyolefin, such as a linear low density polyethylene. Sheathing materials formed from the present crosslinkable polymer composite material are desirably constructed to comply with the requirements of the UL44 specification for XHHW-2.

In some embodiments, the polymer composite may include 100 parts by weight of the silane-grafted thermoplastic polymer blend and about 50 to 300 parts by weight of the metal hydroxide flame retardant. More suitably, the polymer composite may include 100 parts by weight of the silane-grafted thermoplastic polymer blend and about 150 to 200 parts by weight of the metal hydroxide flame retardant (e.g., aluminum hydroxide and/or magnesium hydroxide). The metal hydroxide flame retardant commonly includes magnesium hydroxide. The magnesium hydroxide may include a precipitated magnesium dihydroxide having a $d_{50}$ of about 0.5-2 microns, a BET of about 1-15 m²/g and/or a bulk density of about 300-600 g/L.

In another embodiment, the crosslinkable polymer composite includes a polymer component which includes a silane-grafted thermoplastic polymer blend. The polymer blend may include about 35 to 65 wt. % of an ethylene/alpha-olefin plastomer and about 35 to 65 wt. % polyethylene. For example, the ethylene/alpha-olefin plastomer may include an ethylene/1-octene plastomer having an MFI at 190° C. of about 1-5 g/10 min (as determined pursuant to ISO 1133). The polyethylene is commonly a linear low density polyethylene, which also may desirably have an MFI at 190° C. of about 1-5 g/10 min.

In another embodiment, the present crosslinkable polymer composite includes about 25 to 55 wt. % (often about 40 to 50 wt. %) of the silane-grafted thermoplastic polymer blend; and about 40 to 70 wt. % (often about 45 to 60 wt. %) of a metal hydroxide flame retardant, such as magnesium hydroxide. The silane-grafted thermoplastic polymer blend may be formed from silane grafting (e.g., with a vinyl alkoxysilane and a free radical catalyst) a mixture which includes an ethylene copolymer plastomer, e.g., an ethylene/1-octene plastomer, and a thermoplastic polyolefin, such as a linear low density polyethylene. The resulting silane-grafted polymer blend commonly includes silane-grafted ethylene copolymer plastomer and silane-grafted thermoplastic polyolefin. Such a polymer composite may also include one or more of an antioxidant, an ultrahigh molecular weight silicone processing additive and a UV protector/light stabilizer additive.

In another embodiment, the present crosslinkable polymer composite includes about 40 to 50 wt. % of a silane-grafted thermoplastic polymer blend and about 45 to 60 wt. % metal hydroxide flame retardant selected from magnesium, calcium, zinc and aluminum hydroxide or mixtures thereof. For example, the composite may include the silane-grafted thermoplastic polymer blend and magnesium hydroxide. The silane-grafted thermoplastic polymer blend may include a silane-grafted blend of about 40 to 60 wt. % of an ethylene/alpha-olefin plastomer, which comprises an ethylene/1-octene plastomer having an MFI of about 1-5 g/10 min., and about 40 to 60 wt. % of a thermoplastic polyethylene, such as a linear low density polyethylene having an MFI of about 1 to 5 g/10 min (as determined pursuant to ISO 1133).

In another embodiment, the moisture curable polymer composition includes 100 parts by weight of a crosslinkable thermoplastic polymer comprising silane-grafted ethylene copolymer plastomer, which may include silane-grafted ethylene/alpha-olefin plastomer and/or silane-grafted thermoplastic polyolefin, such as silane-grafted LLDPE; and about 80 to about 300 parts by weight precipitated magnesium hydroxide, e.g., typically having a median particle size (as evidenced by its $d_{50}$ value) of no more than about 3 microns and, often, about 0.1 to 2 microns. The composition may also include one or more of colorant, antioxidant, ultrahigh molecular weight silicone processing additive and UV protector/light stabilizer additive.

In another embodiment, the present crosslinkable polymer composite includes about 25 to 60 wt. % of a silane-grafted thermoplastic polymer blend; and about 40 to 70 wt. % metal hydroxide flame retardant. The silane-grafted thermoplastic polymer blend may be formed from silane grafting a polymer blend, which includes about 40 to 60 wt. % ethylene/1-octene plastomer and about 40 to 60 wt. % linear low density polyethylene. The metal hydroxide flame retardant typically includes precipitated magnesium dihydroxide having average particle size of no more than about 3 microns. For example, the polymer composite may include a silane-grafted thermoplastic polymer blend may be formed from an ethylene/1-octene plastomer having an MFI at 190° C. of about 1-5 g/10 min and a melting temperature of about 70 to 80° C.; and linear low density polyethylene having a melting temperature of about 120 to 130° C. and an MFI at 190° C. of about 1-5 g/10 min. The precipitated magnesium dihydroxide may have a $d_{50}$ of about 0.5-2 microns, a BET of about 1-15 m²/g and/or a bulk density of about 300-600 g/L.

The silane grafted polymer blend may be formed by combining an ethylene copolymer plastomer, e.g., an ethylene/alpha-olefin plastomer such as an ethylene/1-octene plastomer having an MFI of about 1-5 g/10 mi and a thermoplastic polyolefin, e.g., a thermoplastic polyethylene, such as LLDPE, in the amounts shown in the tables above for 1$^{st}$ pass ingredients. The mixture typically also includes antioxidant, vinyl alkoxysilane (e.g., VTMOS) and organic peroxide (such as 1,1-di(tert-butylperoxy)-3,3,5-trimethylcyclohexane) in the amounts shown. The mixture is typically passed through an extruder at a temperature of about 140 to 200° C. to provide the silane grafted polymer blend.

This silane grafted polymer blend may be compounded with metal hydroxide flame retardant and other conventional additives and extruded to form a flame-retardant, crosslinkable polymer composite, which is typically halogen-free. The crosslinkable polymer composite is typically UV stabilised and is curable by exposure to moist conditions, typically at a somewhat elevated temperature. In use, the crosslinkable polymer composite is commonly mixed with a conventional crosslinking catalyst masterbatch, e.g., in a ratio of about 95:5 to 98:2. The moisture cured product is desirably able to satisfy the requirements of the UL44 standards. The product typically shows good flexibility and confers tough sheathing protection. It is particular notable that the moisture cured product may exhibit the excellent high temperature water resistance required under the specifications of UL44, in combination with one or more of the other specifications typically required for such sheathing materials.

Insulating materials formed from curing the crosslinkable, flame retardant polymer composite materials described herein commonly meet one or more of the following specifications:

the composition maintains long term insulation resistance after being exposed to water at 90° C. for at least 24 weeks (as determined pursuant to UL 44 Clause 5.4);

the composition has a tensile strength before aging of at least about 10 MPa (1500 lbf/in²) (as determined pursuant to UL 44 Clause 4.2 & UL 44, Table 11);

the composition has a tensile strength after air oven accelerated aging of at least about 7 MPa (1500 lbf/in²) (as determined pursuant to UL 44 Clause 4.2 & UL 44, Table 11);

the composition has an elongation before aging of at least about 150% (1500 lbf/in²) (as determined pursuant to UL 44 Clause 4.2 & UL 44, Table 11);

the composition has an elongation after air oven accelerated aging of at least about 135% (1500 lbf/in²) (as determined pursuant to UL 44 Clause 4.2 & UL 44, Table 11);

the composition exhibits no cracks or ruptures after being subjected to a cold bend test at −25° C. for 4 hours (as determined pursuant to UL 44 Clause 5.11);

the composition exhibits no cracks or ruptures after being subjected to a cold impact test at −40° C. (as determined pursuant to UL 44 Clause 5.11);

the composition exhibits a deformation of less than about 30% (14-4/0 AWG) (as determined pursuant to UL 44 Clause 5.12);

The embodiments, illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof.

What is claimed is:

1. A crosslinkable polymer composite comprising
(a) 100 parts by weight of a silane-grafted thermoplastic polymer blend formed from silane grafting a polymer mixture in the absence of any metal hydrate flame retardant, wherein the polymer mixture includes about 35 to 65 wt. % ethylene/alpha-olefin plastomer and about 35 to 65 wt. % polyethylene;
wherein the ethylene/alpha-olefin plastomer is an ethylene/1-octene plastomer having a melting temperature of about 70 to 80° C. as determined pursuant to ISO 11357 and a Shore D Hardness of no more than about 30 as determined pursuant to ISO 868;
wherein the silane-grafted thermoplastic polymer blend is formed by reacting a mixture which includes the ethylene/alpha-olefin plastomer, linear low density polyethylene, vinyl alkoxysilane and a free radical initiator;
wherein the composite comprises at least 40 wt. % of the silane-grafted thermoplastic polymer blend; and
(b) about 75 to 150 parts by weight precipitated magnesium hydroxide as a flame retardant;
wherein the composite is formed by compounding the silane-grafted thermoplastic polymer blend with the precipitated magnesium hydroxide flame retardant and other optional additives to provide a compounded mixture; and extruding the compounded mixture to form a halogen free, crosslinkable polymer composite;
wherein an insulation material formed from moisture curing the composite maintains long term insulation resistance after being exposed to water at 90° C. for at least 24 weeks as determined pursuant to UL 44 Clause 5.4.

2. The polymer composite of claim 1, wherein the precipitated magnesium hydroxide flame retardant has a $d_{50}$ of about 0.5-2 microns, a BET of about 1-15 m²/g and a bulk density of about 300-600 g/L.

3. A halogen free, crosslinkable polymer composite comprising:
40 to 50 wt. % of a polymer component, which comprises a silane-grafted thermoplastic polymer blend;
wherein the polymer component includes about 35 to 65 wt. % silane-grafted ethylene/alpha-olefin plastomer, about 35 to 65 wt. % silane-grafted thermoplastic polyethylene; and an ethylene/alpha-olefin plastomer;
wherein the ethylene/alpha-olefin plastomer is an ethylene/1-octene plastomer having a melting temperature of about 70 to 80° C. as determined pursuant to ISO 11357 and a Shore D Hardness of no more than about 30 as determined pursuant to ISO 868; and
45 to 60 wt. % precipitated magnesium hydroxide having average particle size of no more than about 2 microns;
wherein the composite comprises 40 to 50 wt. % of the silane-grafted thermoplastic polymer blend;
wherein the silane-grafted thermoplastic polymer blend is formed by reacting a mixture in the absence of metal hydrate flame retardant, wherein the mixture includes ethylene/alpha-olefin plastomer, thermoplastic polyethylene, vinyl alkoxysilane and a free radical initiator;
wherein the composite is formed by compounding the silane-grafted thermoplastic polymer blend with the precipitated magnesium hydroxide flame retardant and other optional additives to provide a compounded mixture; and extruding the compounded mixture to form a halogen free, flame-retardant, crosslinkable polymer composite;
wherein the silane-grafted thermoplastic polyethylene comprises material formed by silane-grafting a linear low density polyethylene having a melting temperature of about 120 to 130° C. as determined pursuant to ISO 11357;
wherein an insulation material formed from moisture curing the composite maintains long term insulation resistance after being exposed to water at 90° C. for at least 24 weeks as determined pursuant ot UL 44 Clause 5.4.

4. The polymer composite of claim 3, wherein the polymer component comprises one or more of a silane-grafted ethylene/1-octene plastomer and a silane-grafted linear low density polyethylene.

5. The polymer composite of claim 3, wherein the polymer component comprises about 40 to 60 wt. % silane-grafted ethylene/1-octene plastomer and about 40 to 60 wt. % silane-grafted linear low density polyethylene.

6. A halogen-free, crosslinkable polymer composite comprising about 40 to 60 wt. % of a silane-grafted thermoplastic polymer blend; and
about 40 to 60 wt. % precipitated magnesium hydroxide;
wherein the silane-grafted thermoplastic polymer blend is formed from silane grafting a polymer mixture in the absence of metal hydrate flame retardant, wherein the polymer mixture includes about 40 to 60 wt. % ethylene/1-octene plastomer and about 40 to 60 wt. % linear low density polyethylene;
wherein the ethylene/alpha-olefin plastomer is an ethylene/1-octene plastomer having a Shore D Hardness of no more than about 30 as determined pursuant to ISO 868;
wherein the linear low density polyethylene has a melting temperature of about 120 to 130° C. as determined pursuant to ISO 11357 and an MFI at 190° C. of about 1-5 g/10 min as determined pursuant to ISO 1133;
wherein the precipitated magnesium hydroxide comprises about 40 to 75 wt. % of a first precipitated magnesium hydroxide having a $d_{50}$ of about 1.5-2 microns and a BET of about 2-5 $m^2$/g; and about 25 to 60 wt. % of a second precipitated magnesium hydroxide having a $d_{50}$ of about 0.7-1.2 microns and a BET of about 8-12 $m^2$/g;
wherein the composite is formed by compounding the silane-grafted thermoplastic polymer blend with the precipitated magnesium hydroxide and other optional additives to provide a compounded mixture and extruding the compounded mixture to form a halogen free, flame-retardant, crosslinkable polymer composite;
wherein an insulation material formed from moisture curing the composite maintains long term insulation resistance after being exposed to water at 90° C. for at least 24 weeks as determined pursuant to UL 44 Clause 5.4.

7. The polymer composite of claim 6, wherein the ethylene/1-octene plastomer has a melting temperature of about 70 to 80° C. as determined pursuant to ISO 11357.

8. The polymer composite of claim 7, wherein an insulation material formed from the composition has an elongation before aging of at least about 150% as determined pursuant to UL 44 Clause 4.2 & UL 44, Table 11; and a tensile strength before aging of at least about 10 MPa (1500 lbf/in$^2$) as determined pursuant to UL 44 Clause 4.2 & UL 44, Table 11.

9. The polymer composite of claim 3, wherein the precipitated magnesium hydroxide flame retardant comprises about 40 to 75 wt. % of a first precipitated magnesium hydroxide having a $d_{50}$ of about 1.5-2 microns and a BET of about 2-5 $m^2$/g; and about 25 to 60 wt. % of a second precipitated magnesium hydroxide having a $d_{50}$ of about 0.7-1.2 microns and a BET of about 8-12 $m^2$/g.

10. The polymer composite of claim 3, wherein the precipitated magnesium hydroxide flame retardant has a $d_{50}$ of about 0.5-2 microns, a BET of about 1-15 $m^2$/g and a bulk density of about 300-600 g/L.

11. The polymer composite of claim 1, wherein the composite comprises about 40 to 50 wt. % of the silane-grafted thermoplastic polymer blend; and about 45 to 60 wt. % of the precipitated magnesium hydroxide.

12. The polymer composite of claim 3, wherein the polymer component includes a silane-grafted polymer blend formed by reacting a mixture which includes about 45 to 55 wt. % ethylene/1-octene plastomer, about 45 to 55 wt. % linear low density polyethylene, about 1 to 3 wt. % vinyl silane and a free radical initiator.

13. The polymer composite of claim 1, wherein the ethylene/alpha-olefin plastomer has an MFI at 190° C. of about 1-5 g/10 min as determined pursuant to ISO 1133.

14. The polymer composite of claim 6, wherein an insulation material formed from the composition has a tensile strength before aging of at least about 10 MPa (1500 lbf/in$^2$) as determined pursuant to UL 44 Clause 4.2 & UL 44, Table 11.

15. The polymer composite of claim 6, wherein an insulation material formed from the composition has an elongation before aging of at least about 150% as determined pursuant to UL 44 Clause 4.2 & UL 44, Table 11.

16. The polymer composite of claim 1, wherein the polyethylene has an MFI at 190° C. of about 1-5 g/10 min as determined pursuant to ISO 1133.

17. The polymer composite of claim 3, wherein the linear low density polyethylene has an MFI at 190° C. of about 1-5 g/10 min as determined pursuant to ISO 1133.

18. The polymer composite of claim 6, wherein the ethylene/1-octene plastomer has an MFI at 190° C. of about 1-5 g/10 min as determined pursuant to ISO 1133.

* * * * *